US010556357B2

(12) United States Patent
Richter et al.

(10) Patent No.: US 10,556,357 B2
(45) Date of Patent: Feb. 11, 2020

(54) SPLITTING OF THICK HARD-FOAM PLATES

(71) Applicant: Evonik Roehm GmbH, Darmstadt (DE)

(72) Inventors: Thomas Richter, Darmstadt (DE); Kay Bernhard, Darmstadt (DE); Florian Becker, Darmstadt (DE); Felix Goldmann, Griesheim (DE); Tim Denk, Grosswallstadt (DE); Ulrich Schmidt, Floersheim am Main (DE); Mathias Hempler, Freigericht (DE)

(73) Assignee: Evonik Roehm GmbH, Darmstadt (DE)

( * ) Notice: Subject to any disclaimer, the term of this patent is extended or adjusted under 35 U.S.C. 154(b) by 149 days.

(21) Appl. No.: 15/519,866

(22) PCT Filed: Nov. 3, 2015

(86) PCT No.: PCT/EP2015/075520
§ 371 (c)(1),
(2) Date: Apr. 18, 2017

(87) PCT Pub. No.: WO2016/078902
PCT Pub. Date: May 26, 2016

(65) Prior Publication Data
US 2018/0215063 A1    Aug. 2, 2018

(30) Foreign Application Priority Data

Nov. 18, 2014   (EP) .................................. 14193576

(51) Int. Cl.
| | |
|---|---|
| *B26D 7/10* | (2006.01) |
| *B29C 44/56* | (2006.01) |
| *B26D 3/00* | (2006.01) |
| *B26D 1/54* | (2006.01) |
| *B26D 1/50* | (2006.01) |
| *B29L 7/00* | (2006.01) |

(52) U.S. Cl.
CPC ................ *B26D 7/10* (2013.01); *B26D 1/54* (2013.01); *B26D 3/006* (2013.01); *B29C 44/5636* (2013.01); *B26D 1/50* (2013.01); *B29L 2007/002* (2013.01); *B29L 2007/008* (2013.01)

(58) Field of Classification Search
CPC . B26D 7/10; B26D 1/54; B26D 3/006; B26D 7/088; B26D 11/00; B29C 44/5636
See application file for complete search history.

(56) References Cited

U.S. PATENT DOCUMENTS

| | | | |
|---|---|---|---|
| 6,209,430 B1 * | 4/2001 | Desmarais | B26D 3/008 |
| | | | 82/101 |
| 7,638,078 B2 * | 12/2009 | Sasabe | B26D 1/0006 |
| | | | 264/140 |
| 2004/0235973 A1 | 11/2004 | Stein et al. | |
| 2005/0046069 A1 * | 3/2005 | Sasabe | B26D 1/0006 |
| | | | 264/140 |
| 2006/0157886 A1 | 7/2006 | St. Denis et al. | |
| 2011/0048187 A1 | 3/2011 | Uchiumi | |
| 2013/0174700 A1 * | 7/2013 | Cole | B23D 49/00 |
| | | | 83/13 |
| 2014/0251108 A1 | 9/2014 | Tillmann et al. | |
| 2014/0338514 A1 * | 11/2014 | Cole | B23D 49/00 |
| | | | 83/875 |
| 2016/0039986 A1 | 2/2016 | Zimmermann et al. | |
| 2018/0050460 A1 * | 2/2018 | Gonzalez Bohme | B26D 1/00 |

FOREIGN PATENT DOCUMENTS

| | | |
|---|---|---|
| CN | 203254457 U | 10/2013 |
| DE | 29 26 564 A1 | 1/1981 |
| DE | 199 19 181 A1 | 11/2000 |
| DE | 10 2011 084 987 A1 | 4/2013 |
| DE | 10 2013 205 963 A1 | 10/2014 |
| EP | 0 873 827 A1 | 10/1998 |
| EP | 1 444 293 | 8/2004 |

OTHER PUBLICATIONS

International Search Report dated Feb. 26, 2016 in PCT/EP2015/075520 filed Nov. 3, 2015.
European Search Report dated May 21, 2015 in European Application 14193576.7 filed Nov. 18, 2014.

* cited by examiner

*Primary Examiner* — Omar Flores Sanchez
(74) *Attorney, Agent, or Firm* — Oblon, McClelland, Maier & Neustadt, L.L.P.

(57) ABSTRACT

The present invention relates to a method for cutting rigid foams, especially slabstock P(M)I foams. A method is provided here, by means of which it is possible to cut these rigid foams even in relatively high layer thicknesses of, for example, more than 3 mm, without material loss, which is produced in relevant amounts, for example, in the course of sawing as a result of the sawdust formed.

15 Claims, No Drawings

SPLITTING OF THICK HARD-FOAM PLATES

FIELD OF THE INVENTION

The present invention relates to a method for cutting rigid foams, especially slabstock P(M)I foams. A method is provided here, by means of which it is possible to cut these rigid foams even in relatively high layer thicknesses of, for example, more than 3 mm, without material loss, which is produced in relevant amounts, for example, in the course of sawing as a result of the sawdust formed.

PRIOR ART

Rigid foams, for example polymethacrylimide, which is sold under the Rohacell® product name, like other foams as well, can be cut by different methods. The standard way of doing this in the case of Rohacell® is by sawing. In this case, thick foam slabs are divided horizontally by band sawing, giving sawdust in high amounts of relevance. In addition, it is barely possible by this process to obtain thin or very thin sheets or films from the rigid foam. Very thin films are not achievable merely because of the thickness of the saw blades and the relatively high mechanical stress on the region of the rigid foam to be divided off in the course of sawing. Thin sheets having a thickness between 3 and 10 mm are again possible only with great material loss and with relevant dust formation, since a saw blade used in sawing has a relevant thickness of at least 2 mm, which lead to corresponding material loss. If the saw blade chosen, in turn, is particularly thin, it will sag and lead to high thickness variances in the cut material, or makes the dividing-off of films virtually impossible. If thicker sheets having a thickness of more than 10 mm are to be divided, problems likewise arise in the course of sawing, since the bending of the region to be divided off, which is caused by the thickness of the saw blade, would lead to fracture thereof during the division. This is a problem which occurs especially in the case of very rigid foams, which thus have a certain degree of brittleness.

Flexible foams, for example flexible polyurethane foams, can also be cut by the use of band knives, giving no sawdust as waste product.

Many foams (rigid and flexible foams) can additionally be cut by means of heated tensioned wires. However, there is the possibility here of thermal damage to the material as a result of the hot wire. Moreover, as a result of the finite thickness of the wire, there is also the problem here of material loss or of fracture of thin sheets.

OBJECT

Against the background of the prior art discussed, the problem addressed by the present invention was therefore that of providing a method for dividing rigid foams into two planar portions, in which the material loss in the form of dust is minimized and, at the same time, the material is not thermally stressed or excessively damaged in any other way, especially at the division site.

More particularly, the method is to be suitable for production both of films from this rigid foam having a thickness less than 3 mm and thin sheets having a diameter between 3 and 30 mm as required.

A further problem addressed was that this method should be suitable for processing in this way of poly(meth)acrylimide (P(M)I), especially of polymethacrylimide (PMI).

Other objects not explicitly discussed at this point can be derived from the prior art, the description, the claims or the working examples.

SOLUTION

When the term poly(meth)acrylimide (P(M)I) is used hereinafter it means polymethacrylimides (PMI), polyacrylimides (PI) or a mixture thereof. Similar considerations apply to the corresponding monomers such as (meth)acrylimide and (meth)acrylic acid. By way of example, the expression "(meth)acrylic acid" means not only methacrylic acid but also acrylic acid, and also mixtures of these two.

The problems have been solved by means of a novel method for planar division of rigid foams, which is suitable for obtaining films or thin sheets. This novel method is characterized in that the rigid foam is first flexibilized and then cut with a knife. In a first alternative embodiment of the invention, the rigid foam, for flexibilization, is stored in water prior to cutting. In a second embodiment, the rigid foam is heated or adjusted to a temperature which is a minimum of 15° C. and a maximum of 1° C. below the foaming temperature of the rigid foam. Adjusting the temperature means that the still-hot foam is cut directly after the foaming operation while cooling to the temperature window shown.

In addition, these two alternatives may also be combined with one another, by correspondingly heating the water, optionally under pressure, and adding a preheated rigid foam to the heated water or additionally heating the rigid foam after the removal from the water and before cutting.

The foaming temperature is understood in accordance with the invention to mean the temperature from which the foaming sets in in the foaming of the polymer conducted beforehand. This temperature depends primarily on the blowing agent used and is easy to set and to determine by the person skilled in the art. In the cutting operation, the foaming temperature is of significance, since there can be further foaming here, which would disrupt the cutting operation or make it impossible.

In the embodiment of heating, the rigid foam is preferably flexibilized prior to cutting by storing in an oven or by irradiating with IR rays or microwaves. For this purpose, there are several variants in addition to the selection of the heat source. In a first variant, the rigid foam is cut with a knife directly after removal from an oven or a heated press. In a second variant, the knife is within the oven. This variant is performable in a particularly efficient manner, but is very demanding in apparatus terms. In this case, it is not necessary to heat the entire foam slab to be cut. It is sufficient to heat a layer corresponding to about twice the thickness of the layer thickness to be cut. This can also be effected continuously.

With regard to the temperature to be set, it is especially preferable that the rigid foam is heated prior to cutting to a temperature above the heat distortion resistance temperature of the rigid foam material. According to the material, this temperature may be very different, but is always below the foaming temperature in the case of suitable rigid foam materials. In the case of rigid P(M)I foams, the foaming temperatures are set primarily via the choice of blowing agent. On completion of foaming, there is generally further foaming in the course of a new heating operation, which would naturally be disruptive in the planar division operation according to the invention.

In a third variant, the rigid foam is first moved past the IR or microwave radiation sources and subsequently transported to the knife with a maximum distance of 2 m. In addition, the radiation source may also be arranged in such a way that it is directly above the knife or covers the region directly upstream of and above the knife. Especially heating by means of IR radiators allows heating directly upstream of the knife.

In a fourth variant of the method according to the invention, the division of the still-heated rigid foams is effected directly after the foaming operation in an oven or in a heated press.

In the embodiment of water storage prior to the division, the rigid foam is stored in the water bath for at least 30 min, preferably for at least one hour and more preferably for at least 24 hours. The storage time depends especially on the thickness of the rigid foam to be divided. After the water storage, the rigid foam is then divided by the knife within not more than 30 min, preferably within not more than 10 min.

With regard to the arrangement of the knife too, there are various embodiments. In a preferred embodiment, the rigid foam slab is moved at right angles to the cutting surface of the knife, while the knife moves only at right angles to the transport direction of the rigid foam slab. Alternatively, albeit less preferably, the knife in the cutting operation is moved along a fixed rigid foam. It is also possible that the knife and the rigid foam have opposite directions of movement, in which case the knife in the two latter variants can effectively be moved at right angles to the rigid foam in addition to the support of the cutting operation.

In the case of movement of the knife at right angles, there are again two variants. Firstly, the knife can be moved back and forth. However, it is preferable to use a band knife. Such a band knife is moved in a circuit in one direction at right angles to cutting direction and is generally guided and driven by means of at least two deflecting rollers. Band knife systems are commercially available.

In a particular embodiment of the invention, several pieces, for example in the form of films or thin sheets, are divided off from the rigid foam after the flexibilization in one movement by means of several knives in succession. These may especially be several band knives in series. Thus, it is possible to divide several workpieces off from one slab in one operation in a very efficient manner.

Great advantages of the present invention are that the occurrence of waste in the form of sawdust is virtually avoided in the division of rigid foams, and that thermal damage to the rigid foam surfaces is ruled out. Thus, material loss can be limited and the method is more economically viable overall than prior art processes.

Specifically in the case of particularly rigid foams having high stiffness and brittleness, for example rigid P(M)I foam, the problem that the slabs fracture in the course of cutting, especially as a result of the wedge-shaped cross section of the blade, can surprisingly be avoided by means of the method according to the invention. This is especially effected by increasing the flexibility of the foams prior to cutting.

With regard to the division product, a distinction should be made between two different possibilities. Firstly, it is possible in accordance with the invention to obtain a film consisting of the rigid foam having a thickness between 0.05 and 1.0 mm. According to the rigid foam material used, films of this kind may be so flexible that they can, for example, be rolled up or even folded. For example, it is possible to wind the film divided off onto a roll after the separating operation, for example for further transport.

Alternatively, it is also possible by means of the method of the invention to obtain thin sheets consisting of the rigid foam having a thickness between more than 1.0 and a maximum of 30.0 mm. For instance, it is possible by means of a suitable cutting operation to obtain several sheets of this kind from one rigid foam slab. According to the prior art, it was necessary to foam each of these thin sheets separately.

Irrespective of whether thin sheets or films are divided off, they can be upgraded or processed further in subsequent steps. For instance, they can first be cut to size in the two other dimensions after the division. In this way, smaller sheets or films that are easier to transport or to store are obtained.

Alternatively, it is also possible by means of an appropriate upward movement of the knife, especially for dividing off films, to divide off pieces in cutting direction. It is thus possible to obtain individual pieces having a width defined in turn by the width of the rigid foam used in one operation, without subsequent division. This variant is particularly suitable especially for films or very thin sheets, since a cut edge with a correspondingly pointed end is also obtained at this division site with increasing thickness.

Alternatively or additionally, the film or the thin sheet can subsequently be covered with at least one outer layer. These outer layers may, for example, be composite materials, metal or wood. For example, it is possible to achieve sandwich materials used in lightweight construction. Alternatively, the outer layers may simply be merely a protective film that can be removed again or a decorative layer.

Rigid foams which can be processed in accordance with the invention especially include PE, PP, PVC, PU, PMMA and P(M)I foams. The material for the foam core is preferably P(M)I, more preferably PMI. These P(M)I foams are also termed rigid foams, and feature particular robustness. The P(M)I foams are normally produced in a two-stage process: a) production of a cast polymer, and b) foaming of said cast polymer.

Production of the cast polymer begins with production of monomer mixtures which comprise, as main constituents, (meth)acrylic acid and (meth)acrylonitrile, preferably in a molar ratio of from 2:3 to 3:2. Other comonomers can also be used, examples being esters of acrylic or methacrylic acid, styrene, maleic acid and itaconic acid and anhydrides thereof, and vinylpyrrolidone. However, the proportion of the comonomers here should not be more than 30% by weight. Small quantities of crosslinking monomers can also be used, an example being allyl acrylate. However, the amounts should preferably be at most from 0.05 to 2.0% by weight.

The copolymerization mixture moreover comprises blowing agents which at temperatures of about 150 to 250° C. either decompose or vaporize and thus form a gas phase. The polymerization takes place below this temperature, and the cast polymer therefore comprises a latent blowing agent. The polymerization advantageously takes place in a slab mould between two glass plates. For the production of foamed sheets, this is then followed according to the prior art by the foaming of the cast polymer in a second step at an appropriate temperature. The production of these PMI foams is known in principle to the person skilled in the art and can be found by way of example in EP 1 444 293, EP 1 678 244 or WO 2011/138060. PMI foams that may be mentioned in particular are ROHACELL® grades from Evonik Industries AG. Acrylimide foams are considered to be analogous to the PMI foams in relation to production and processing. However, acrylimide foams are markedly less preferred than other foam materials for reasons of toxicology.

The density of the rigid foam material can be selected relatively freely. An example of the density range within which P(M)I foams can be used is from 20 to 320 kg/m$^3$, preferably from 25 to 250 kg/m$^3$. It is particularly preferable to use a PMI foam of density from 30 to 200 kg/m$^3$.

PE foams and PP foams are known especially as insulation material, in transport containers and as sandwich material. PE foams and PP foams can comprise fillers, and are mostly commercially available in the density range from 20 to 200 kg/m$^3$.

In contrast, PMMA foams feature particularly good weathering resistance and high UV resistance. However, industry has not hitherto regarded PMMA foams as having any great importance.

In contrast, polyurethane (PU) is well known as foam material. The hardness of PU foams is generally set via the di- or polyols and isocyanates used, and especially a high level of crosslinking.

PVC foams are especially very brittle and hence of only limited suitability for the method of the invention. Nevertheless, these can also surprisingly be processed in accordance with the invention.

In principle, the cut rigid foams according to the invention have very broad usability. Thin sheets produced in accordance with the invention may especially find use in mass production, for example for bodywork construction or for interior trim in the automobile industry, parts for interior fitting in rail vehicle construction or in shipbuilding, in aerospace, in mechanical engineering, for production of sports equipment, in furniture construction or in the construction of wind turbines.

Rigid foam films, in contrast, may find use, for example, as membranes, especially in loudspeakers, mobile music players or headphones. It is also conceivable to use these for decorative purposes, for example for surface finishing of articles.

WORKING EXAMPLES

The examples described below comprise various PMI foams. The inventive effect is surprising for the closed pores of this foam. Accordingly, the results can be transferred in a simple manner to other rigid foams which, as is known by the person skilled in the art, are effectively characterized by exclusively closed pores.

A band knife system from Fecken and Kirfel having a band knife speed of 120 m/sec and a table advance rate of 20 m/min was used for the division. The system was equipped with a vacuum table, holding rolls and automatic thickness adjustment.

Rigid PMI foams of the Rohacell IG-F, HERO and RIMA brands, having nominal densities of 71 and 110 kg/m$^3$, were divided. The division format was 950×500 mm.

Example 1: Division after Water Storage

The slabs to be divided were stored under water for 30 h and then divided at room temperature. The division thicknesses were 1 mm and 2 mm. The slabs were divided without fracture.

Example 2: Division after Heating in an Oven

The foam slabs to be divided were stored in an air circulation oven at 160 to 190° C. for 2 hours in each case. Thereafter, they were divided. The time delay between removal from the oven and the commencement of the division operation was about 10 sec. The division thicknesses were set between 2 and 15 mm. The slabs were divided without fracture.

Example 3: Division after Heating in a Heated Press

The heating in a heated press took place at a heating plate temperature between 160° C. and 190° C. for 2 h, the plates of the heated press having been in contact with either side of the foam slab; the plate pressure was adjusted to a maximum of 0.2 bar. The time delay between removal from the heated press and the commencement of the division operation was about 10 sec. The division thicknesses were set between 2 and 15 mm. The slabs were divided without fracture.

Example 4: Division Directing after the Foaming Operation

For division directly after the foaming operation which was conducted at 230° C., the freshly foamed Rohacell foam slab was divided directly. The time delay between removal from the foaming oven and the commencement of the division operation was about 20 sec, such that the foam block cooled down to a temperature between 215 and 220° C. The slabs were divided without fracture.

Example 5: Division by Heating with IR Radiation During the Division Process

The plant was supplemented with an IR radiator field. The width of the radiator field was chosen such that it was 20 cm broader than the foam slab to be cut on either side. The length of the radiator field was 100 cm. The IR radiator field was positioned such that it was upstream of the band knife. The slabs were divided at a division thickness of 10 mm with a speed of 1 m/min. The power of the radiator field was chosen such that the slabs could be divided without tears or fracture.

The invention claimed is:

1. A method for planar division of a rigid foam to obtain a film or thin sheet, said method comprising:
   flexibilizing the rigid foam to obtain a flexibilized foam, and
   cutting the flexibilized foam with a knife,
   wherein said flexibilizing of the rigid foam prior to cutting is accomplished by storing the rigid foam in water and/or heating or adjusting to a temperature in a range of from T-15° C. to T-1° C. where T is a foaming temperature of the rigid foam, and
   the rigid foam is a PE, PP, PVC, PMMA or P(M)I foam.

2. The method according to claim 1, wherein the rigid foam is flexibilized prior to cutting by storing in an oven or by irradiating with IR rays or microwaves.

3. The method according to claim 2, wherein the rigid foam is cut with the knife directly after removal from an oven or a heated press, or wherein the knife is within the oven.

4. The method according to claim 2, wherein the rigid foam is first moved past the IR or microwave radiation sources and subsequently transported to the knife with a maximum distance of 2 m, or wherein the radiation source is directly above the knife.

5. The method according to claim 1, wherein the rigid foam is heated prior to cutting to a temperature above the heat distortion resistance temperature of the rigid foam material.

6. The method according to claim 1, wherein the rigid foam is stored in a water bath for at least 30 min and then divided with the knife within not more than 30 min.

7. The method according to claim 1, wherein the rigid foam slab is moved at right angles to the cutting surface of the knife, and wherein the knife moves only at right angles to the transport direction of the rigid foam slab.

8. The method according to claim 1, wherein the rigid foam is a P(M)I foam having a density between 20 and 320 $kg/m^3$.

9. The method according to claim 1, wherein a film consisting of the rigid foam having a thickness between 0.05 and 1.0 mm is obtained.

10. The method according to claim 1, wherein a thin sheet consisting of the rigid foam having a thickness between more than 1.0 and a maximum of 30.0 mm is obtained.

11. The method according to claim 1, wherein the knife is a band knife which moves in a circuit at right angles to the cutting direction.

12. The method according to claim 9, wherein the film or the thin sheet is subsequently covered with at least one outer layer.

13. The method according to claim 1, wherein several films or thin sheets are divided off from the rigid foam after the flexibilizing, in one movement with several knives in succession.

14. The method according to claim 1, wherein the film or thin sheet is divided off, and after having been divided, is cut to size in the two other dimensions.

15. The method according to claim 9, wherein the film divided off is subsequently wound onto a roll.

* * * * *